US006849977B2

United States Patent
Walther et al.

(10) Patent No.: US 6,849,977 B2
(45) Date of Patent: Feb. 1, 2005

(54) DRIVE DEVICE

(75) Inventors: Bernd Walther, Biethigheim-Bissingen (DE); Klaus Epple, Obersulm (DE)

(73) Assignee: Valeo Wischersysteme GmbH (DE)

( * ) Notice: Subject to any disclaimer, the term of this patent is extended or adjusted under 35 U.S.C. 154(b) by 15 days.

(21) Appl. No.: 10/344,913

(22) PCT Filed: Aug. 9, 2001

(86) PCT No.: PCT/EP01/09197

§ 371 (c)(1), (2), (4) Date: Feb. 18, 2003

(87) PCT Pub. No.: WO02/19502

PCT Pub. Date: Mar. 7, 2002

(65) Prior Publication Data

US 2004/0075353 A1 Apr. 22, 2004

(30) Foreign Application Priority Data

Aug. 26, 2000 (DE) .......................................... 100 42 106

(51) Int. Cl.[7] ................................................ H02K 7/08
(52) U.S. Cl. ............................ 310/90; 310/91; 384/517
(58) Field of Search .............................. 310/90, 91, 89, 310/67 R, 66; 384/517, 518, 215–233; 29/596–598

(56) References Cited

U.S. PATENT DOCUMENTS

| 4,159,052 A | * | 6/1979 | Ernst et al. | ................... 192/98 |
| 5,237,228 A | * | 8/1993 | Fries | ........................... 310/87 |
| 5,399,205 A | * | 3/1995 | Shinohara et al. | ........... 134/40 |
| 5,811,902 A | * | 9/1998 | Sato | ........................... 310/90 |

FOREIGN PATENT DOCUMENTS

| DE | 195 13 970 | 10/1996 | |
| DE | 198 24 382 | 12/1999 | |
| JP | 63209446 A | * 8/1988 | ................. 310/90 |

* cited by examiner

Primary Examiner—Tran Nguyen
Assistant Examiner—Leda T. Pham
(74) Attorney, Agent, or Firm—J. Gordon Lewis

(57) ABSTRACT

A drive device includes an electric drive motor, a housing, at least one shaft driven by the drive motor, compensation elements enabling the end play of the shaft to be adjusted or compensated while the shaft is being mounted, and fixing elements which are used to fix the shaft after the end play has been adjusted or compensated. The compensation elements include a spring element which is arranged inside the housing and which axially actuates the shaft. The fixing elements are not accessible from the outer side of the housing.

20 Claims, 3 Drawing Sheets

DRIVE DEVICE

BACKGROUND

The invention relates to a drive device having an electric drive motor, having a casing, and at least one shaft driven by the drive motor, with compensating means with which an adjustment of or compensation for end play of the shaft can be made when installing the shaft, and with securing means with which the shaft is secured after end play has been adjusted or compensated for. The invention also relates to a method of installing a drive device of this type.

The shaft driven by the drive motor is understood to mean in what follows an output shaft driven by the drive motor through a gear, specifically through a worm gear, as well as an armature shaft driven directly by the drive motor.

Drive devices of this type find an application particularly in the automotive industry as servo motors for seat adjusters, steering column adjusters, window regulators, sliding sunroofs or similar, and as drive devices for windshield wiper systems. The drive devices normally have a worm gear attached to the drive motor, which advantageously has small dimensions, can transmit high levels of power and is self-locking.

Specifically because of the tapered flanks of the worm and the worm wheel in a worm drive of this type, an axial force acts on the armature shaft of the drive motor during operation of the drive device, as well as on the output shaft of the worm drive. The direction of the axial force depends on the direction of the armature shaft rotation. With a change in direction of the drive motor or a change in external load, the direction of the axial force on the armature shaft as well as on the output shaft is reversed. During the installation of a shaft of this type, it is of special importance to adjust the end play precisely, or to compensate for the end play, so that the shafts is carried free of end play. If the shaft of drive devices of this type are installed with end play, abrupt starting motions and irritating noises result when the drive motor reverses direction. Furthermore, noticeable relative motions can result if the servo motor is employed as a seat back adjuster, for example. The person occupying the particular seat perceives the end play as relative movement of the seat back, even when the motor of the drive device is not running. This phenomenon is additionally known in the case of steering column adjusters. End play that is present can additionally lead to uneven loading on the shaft, and on the worm and worm wheel, causing malfunctions of the drive device.

A generic drive device is known from DE 198 24 382 A1 in which the end play is adjusted during assembly by means of a pin projecting from the housing of the drive device. A pin of this type is then swaged to the housing after the end play is adjusted.

The prior art of this type has the disadvantage that compensation for, or adjustment of the end play is complicated to perform. An extra device is required which exerts a force from the outer side of the housing on the end bearing carrying the shaft by way of the corresponding pin. In addition, because of the opening extending through the housing to receive the pin, problems can arise with the sealing of the worm drive.

The object of the present invention is therefore to eliminate the disadvantages of the previously enumerated disadvantages of the prior art.

SUMMARY

This object is achieved in the case of a drive device of the type described above in accordance with the invention, in which the compensating means comprises a spring element located inside the housing and impinging axially on the shaft, and the securing means is not accessible from the outer side of the housing. By reason of a spring element of this type, it is possible to assemble the shaft under axial pre-load. Compensating means in accordance with the prior art which effect compensation for, or adjustment of the end play from the outer side of the housing are rendered unnecessary. As a result of the compensating means being located inside the housing in the form of a spring element, no aperature or aperture in the housing is required to achieve adjustment of or compensation for end play. Advantageous provision is also made under the invention for the securing means not to be accessible from the outer side of the housing, whereby no breakthrough in the housing is required to secure the securing means. A housing without such aperaturess can be produced particularly cost-effectively in series production because corresponding work operations which are necessary under the prior art are redundant. Furthermore, no problems arise with sealing a housing of this type which has no aperatures. Consequently under the invention measures to seal the housing are redundant.

In an advantageous aspect of the invention, the spring element is supported against the housing. This dispenses with the need for additional components which receive and redirect the force of the spring into the housing.

In another particularly advantageous aspect of the invention the spring element impinges on a pressure ring which bears against the outer race of a bearing, specifically a roller bearing, which is provided to carry the shaft. The outer race is axially moveable with respect to the housing, or the bearing section of the housing respectively, to provide relative movement of the bearing with respect to the housing. Through the bearing, or the inner race, an axial force is exerted on the shaft, which results in compensation for end play.

Advantageous provision can be made for the pressure ring to have a shaft-like flange which can be secured to the housing as a compensating means, wherein the shaft-like flange is enclosed specifically by a closed, cup-shaped section of the housing in the final assembly position. After compensating for or adjusting end play, the shaft-like flange can be secured to the housing by reason of the axial force exerted by the spring element on the shaft bearing, or on the shaft respectively.

Securing can be advantageously effected by staking the securing means, the shaft-like flange for example, to the housing. Circumferential staking is one possibility, as well as a 4- or 6-punch staking. Alternatively it is also conceivable to weld the securing means to the housing.

In a particularly advantageous aspect of the invention, the spring element is a spring washer mounted on the shaft, specifically a diaphragm spring washer. A spring washer of this type can be installed to economize on space and demonstrates suitable spring characteristics.

A further aspect of an inventive drive device is characterized in that the drive device can be assembled axially from one side. This is of great advantage particularly in series production, since assembly in this manner can be implemented easily and saves costs.

In accordance with the invention, the shaft can be an input shaft driven by the drive motor through a gear, specifically a worm gear, or can also be an armature shaft driven directly by the drive motor.

The object stated above is also achieved through a procedure to assemble a drive device, which provides for a free end of the shaft to be inserted into the pre-installed bearing which is supported against the housing, for the outer race of the bearing to be pressed against the pressure ring by reason of the end displacement of the shaft, where the pressure ring has a shaft-like flange facing away from the direction of installation, and for the pressure ring to be impinged on by an axial spring force from the spring element exerted counter to the direction of installation and for the shaft-like flange to be secured to the housing in the final installed position of the shaft, specifically to be staked to a closed cup-shaped section of the housing enclosing the flange. An assembly procedure of this type has the advantage that adjustment of or compensation for end play is carried out automatically. Furthermore, the securing of the shaft position can be carried out from outer side of the housing. Overall, assembly of this kind can be accomplished simply and in a cost-effective manner.

BRIEF DESCRIPTION OF THE DRAWING

Additional advantageous aspects and particulars of the invention can be found in the description to follow, in which the invention is described and explained in greater detail with reference to the aspect shown in the drawing.

DETAILED DESCRIPTION

Figure 1:
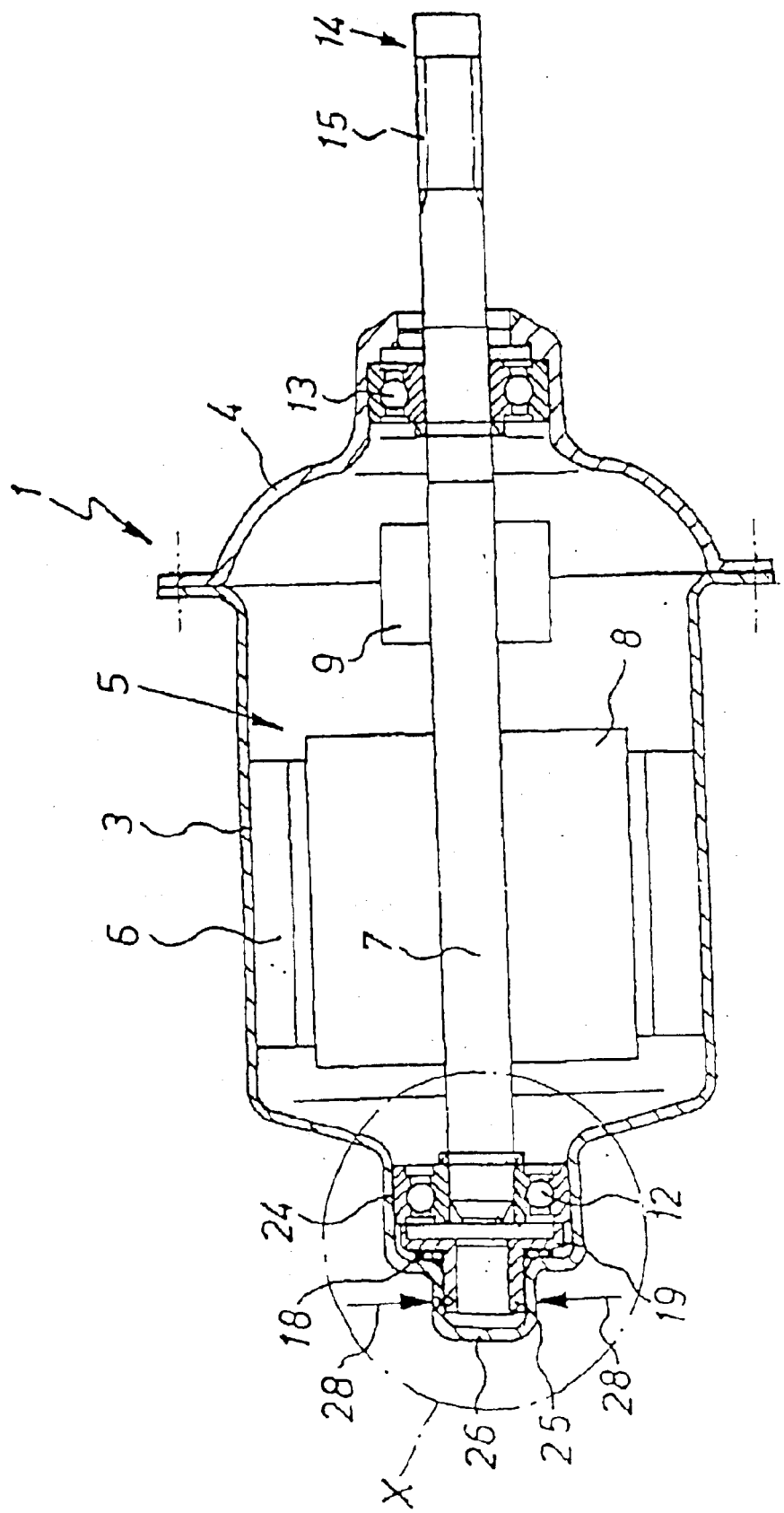
FIG. 1 shows a schematic representation of a drive device in accordance with the invention in a longitudinal section in the final installed position.

The drive device 1 shown in FIG. 1 has a housing which basically comprises two housing sections, specifically a housing base 3 and a housing cover 4. The drive device further has a drive motor 5, which comprises a stator 6 located on the housing base 3 as well as an armature 8 located on a shaft 7, specifically the armature shaft. In addition, a collector 9 is shown schematically on the armature shaft 7. Two roller bearings 12 and 13 are provided to carry the shaft 7.

The free end 14 of the shaft 7 projecting from the housing cover 4 has a worm 15 to drive a worm wheel, which is not shown.

To ensure permanent, trouble-free operation of such a drive device, it is necessary to assemble the drive device 1 in such a way that the shaft 7 is ideally installed without end play. Because of the beveled teeth on the worm 15, high axial forces occur when the shaft 7 changes direction. If a drive device 1 of this type exhibits end play in the assembled state, after a short time it results initially in annoying noise during operation. With continued operation, this end play can lead to operating malfunctions and to failure of the drive device 1.

Figure 2:
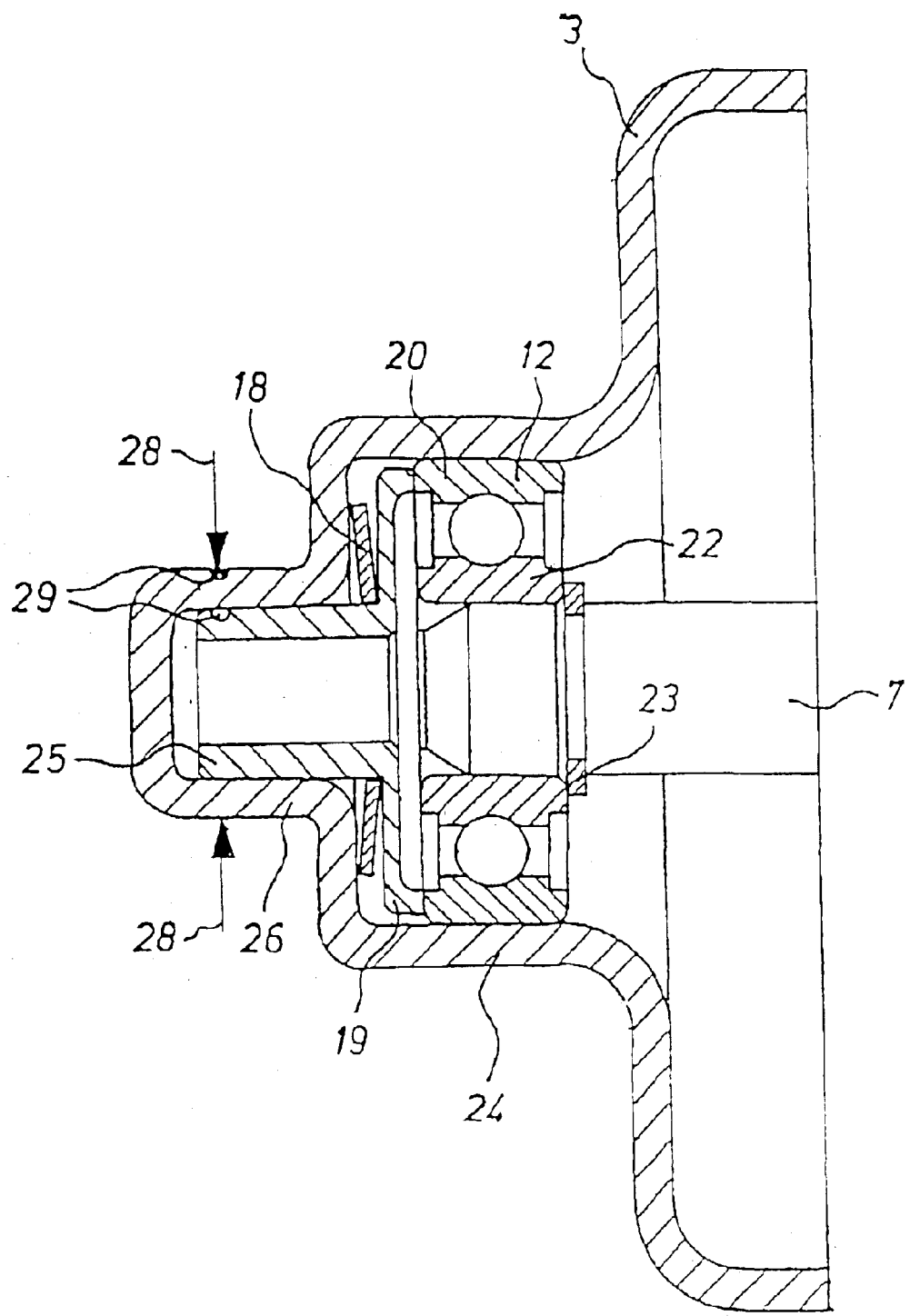
FIG. 2 shows an enlarged view of the section identified in FIG. 1 by X.

As compensating means to adjust or the compensate for end play, a spring element, specifically a diaphragm spring washer 18, which can be seen clearly in FIG. 2, is provided inside the housing base 3. The spring washer 18 is located on a shaft-like flange 25 and is supported against the housing base 3. The spring washer 18 imposes an axial spring force against a pressure ring 19 formed in one piece with the flange 25, said ring in turn impinging on the outer race 20 of the bearing 12. The shaft-like flange 25 facing away from the shaft 7 is received by a closed, cup-shaped section 26, or is enclosed by the section. The fit between the outer race 20 and the area of the housing base 3 surrounding the outer race 20 is selected such that axial displacement of the bearing 12 is possible by reason of the spring force being exerted on the outer race 20 through the pressure ring 19. The inner race 22 of the bearing 12 acts axially against a lock ring 23 positively located on the shaft, the ring transferring the force emanating from the spring element 18 into the shaft 7. By reason of the axially exerted spring force emanating from the spring washer 18, there is subsequently axial impingement on the shaft 7 through the pressure ring 19, the bearing 12 and the lock washer 23. The end play of the shaft 7 is thereby adjusted or compensated for during the installation process. However, it must be pointed out that the axial spring force from the spring washer must not be so high that the bearing 12, or the outer race 20 compared with the inner race 22, is subjected to excessive axial loading. Loading of this type can lead to high bearing wear and ultimately to failure of the bearing 20.

Figure 3:
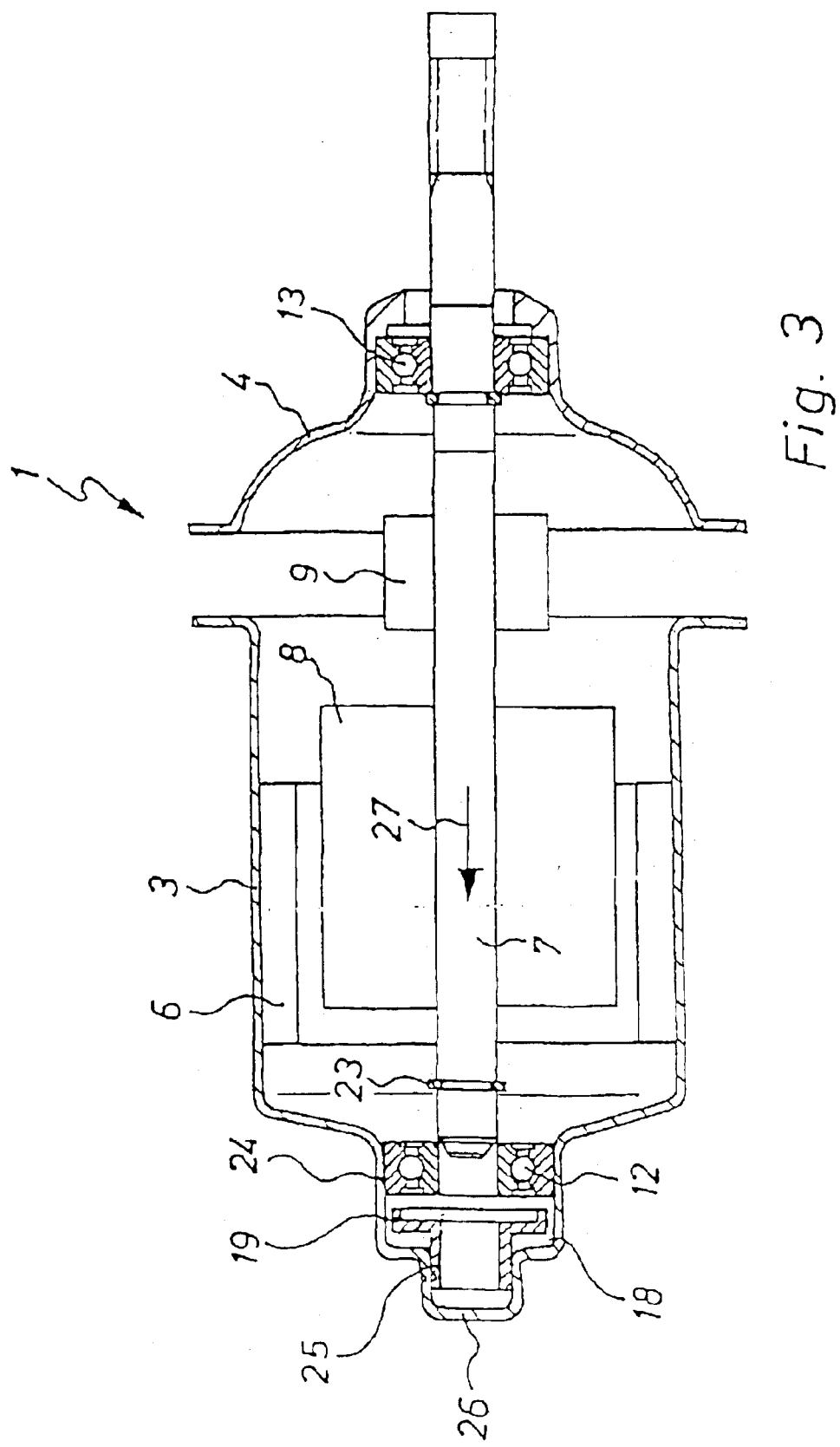
FIG. 3 shows the drive device from FIG. 1 in its pre-installation position.

FIG. 3 clearly illustrates the assembly procedure for the drive device 1. First, the pressure ring 19 with shaft-like flange 25 and the spring washer 18 installed over it is inserted into the cup-shaped section 26 of the housing base 3. Further, the bearing 12 is pushed into the bearing section 24 of the housing base 3 provided for it. As can be seen clearly from FIG. 3, the sides of the pressure ring 19 facing the bearing 12 are spaced from the bearing 12.

At the same time, the housing cover 4 can be assembled independently thereof to the bearing 13 which is supported against the housing cover 4 and the armature shaft 7, which carries the armature 8 and the collector 9. A brush mounting plate, for example, with appropriate brushes and other components can be assembled to the housing cover 4.

In a subsequent operation, the end of the shaft carrying the locking ring 23 can be inserted axially into the bearing 12 in the direction of the arrow 27. The locking ring 23 is thereby brought up to the inner race 22 of the bearing 12 and the entire bearing 12 in the bearing section 24 is pushed axially in the direction of the pressure ring 19. If the shaft 7 is moved further in the axial direction, the pressure ring is impacted with a spring force by reason of the spring washer 18, which acts against the direction of installation 27. When the shaft 7 reaches its final installation position, which is shown in FIG. 1, the shaft 7 is then rides without end play between the two bearings 12 and 13.

In a further operation, the shaft-like flange 25 is secured to the cup-shaped section 26 of the housing base 3. When it is secured, the secured means, specifically the shaft-like flange 25, is not accessible from the outer side of the housing in accordance with the invention. Advantageously, a breakthrough in the housing base 3, or the cup-shaped section 26, is not required to secure the shaft-like flange 25. As a result of there being no provision for breakthroughs in the housing base 3 and the cup-shaped section 26 to adjust or compensate for end play or to secure the shaft-shaped flange 25, no undesirable media such as humidity, dust or dirt can penetrate to the interior of the drive device 1. A drive device 1 of this type is therefore sealed against external influences.

The shaft-like flange 25 is preferably staked to the cup-shaped section 26 along the arrows 28 shown in FIGS. 1 and 2. This staking can take the form of circumferential staking. It is also conceivable to stake it at 4 or 6 points. In order to achieve a definite deformation of the section 26 and the flange 25 during the staking procedure, the section 26 and the flange 25, as shown in FIG. 2 can have annular groove-like notches. Instead of staking, it is also conceivable to secure section 26 with the flange 25 by means of welding after end play has been adjusted and thus connect them immovably.

After securing, advantageously no axial forces act upon the shaft 7 which rides without end play. Since the spring washer 18 is positioned under pre-load between the housing and the pressure ring, no irritating noises, in particular rattling noises can emanate from the spring washer 18 captured in this way, even during later operation of the drive device 1.

As is clear from FIG. 3 and the attendant description, the drive device 1 in accordance with the invention can be assembled axially from one side. This results in enormous cost savings, particularly in volume series production.

In the aspect shown and described, the shaft 7 is an armature shaft. It is also conceivable that a shaft driven by a gear, specifically by a worm gear, can be assembled in a similar manner without end play.

As a result of the cup-shaped section 26 having a closed configuration, machining operations, which are required in accordance with the prior art, are also not necessary. The adjustment of end play, or the compensation for end play, can be performed without any steps or adjustments from outside; adjustment or compensation for end play takes place automatically. No additional adjustment procedure is needed.

All the features shown in the description, the claims to follow and the drawing can be essential to the invention both individually and in any combination together.

What is claimed is:

1. In a drive device with an electric drive motor, having a housing, at least one shaft driven by the drive motor, with compensating means for compensating end play in the shaft and with securing means for securing the shaft following compensation for end play, wherein a pressure ring coupled to the securing means impinges on an outer race of a roller bearing carrying the shaft, the improvement comprising:

the compensating means including a spring element located inside the housing exerting an axial force on the shaft through the pressure ring and the bearing; and the securing means including the pressure ring having a flange secured to the housing, where the flange is enclosed by a closed, cup-shaped section of the housing and is inaccessible from the outer side of the housing.

2. The drive device of claim 1, wherein the spring element is supported against the housing.

3. The drive device of claim 1, wherein the securing means is staked to the housing.

4. The drive device of claim 1, wherein the spring element is a spring washer positioned on the shaft.

5. The drive device of claim 1, wherein the drive device can be assembled axially from one side.

6. The drive device of claim 1, wherein the shaft is an output shaft driven by the drive motor through a gear.

7. The drive device of claim 1, wherein the shaft is an armature shaft driven by the drive motor.

8. The drive device of claim 1, assembled by a process comprising the steps of:

inserting one free end of the shaft into the pre-assembled bearing supported against the housing;

pressing the outer race of the bearing against the pressure ring through axial displacement of the shaft, where the pressure ring has a flange facing away from a direction of installation;

impacting the pressure ring by an axial spring force from a spring element opposite to the direction of installation; and with the shaft in the finally installed position, securing the flange to the housing by staking the flange to a closed, cup-shaped section of the housing surrounding the flange.

9. The drive device of claim 4, wherein the spring washer is a diaphragm spring washer.

10. The drive device of claim 6, wherein the gearing is a worm.

11. A drive device comprising:

an electric drive motor;

a housing for the electric drive motor;

at least one shaft driven by the drive motor;

a roller bearing carrying the shaft;

a pressure ring impinging on an outer race of the roller bearing;

compensating means for compensating end play in the shaft, the compensating means including a spring element located inside the housing exerting an axial force on the shaft through the pressure ring and the roller bearing; and securing means for securing the shaft following compensation for end play, wherein the pressure ring is coupled to the securing means and has a flange secured to the housing, where the flange is enclosed by a closed, cup-shaped section of the housing and is inaccessible from the outer side of the housing.

12. The drive device of claim 11, wherein the spring element is supported against the housing.

13. The drive device of claim 11, wherein the securing means is staked to the housing.

14. The drive device of claim 11, wherein the spring element is a spring washer positioned on the shaft.

15. The drive device of claim 14, wherein the spring washer is a diaphragm spring washer.

16. The drive device of claim 11, wherein the drive device can be assembled axially from one side.

17. The drive device of claim 11, wherein the shaft is an output shaft driven by the drive motor through a gear.

18. The drive device of claim 17, wherein the gear is a worm.

19. The drive device of claim 11, wherein the shaft is an armature shaft driven by the drive motor.

20. The drive device of claim 11, assembled by a process comprising the steps of:

inserting one free end of the shaft into the roller bearing pre-assembled to be supported against the housing;

pressing the outer race of the bearing against the pressure ring through axial displacement of the shaft, where the pressure ring has a flange facing away from a direction of installation;

impacting the pressure ring by an axial spring force from a spring element opposite to the direction of installation; and with the shaft in the finally installed position, securing the flange to the housing by staking the flange to a closed, cup-shaped section of the housing surrounding the flange.

* * * * *